(No Model.)
J. W. HOWELL.
ELECTRICAL INDICATOR.
No. 549,919. Patented Nov. 19, 1895.
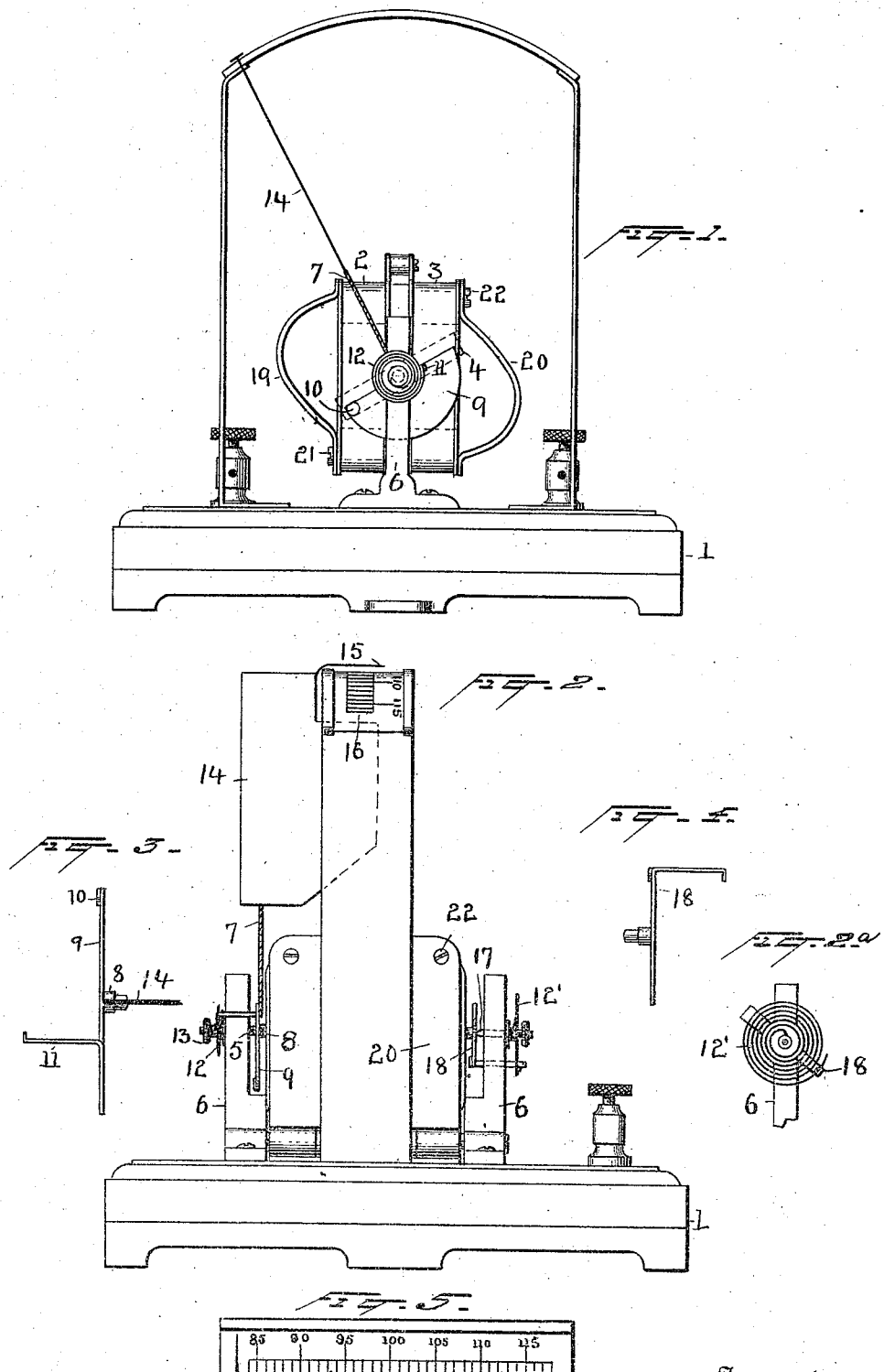
Witnesses
Norris A. Clark.
N. F. Oberlé
Inventor
J. W. Howell
By his Attorneys
Dyert Seely

UNITED STATES PATENT OFFICE.

JOHN W. HOWELL, OF NEWARK, NEW JERSEY, ASSIGNOR TO THE EDISON GENERAL ELECTRIC COMPANY, OF NEW YORK, N. Y.

ELECTRICAL INDICATOR.

SPECIFICATION forming part of Letters Patent No. 549,919, dated November 19, 1895.

Application filed January 2, 1892. Serial No. 416,792. (No model.)

*To all whom it may concern:*

Be it known that I, JOHN W. HOWELL, a citizen of the United States, residing at Newark, in the county of Essex and State of New Jersey, have invented a certain new and useful Improvement in Electrical Indicators, of which the following is a specification.

The present invention relates to electrical indicators, and especially to volt-indicators. The main object of the invention is to provide an indicator for high-potential systems, which indicator shall have a comparatively short indicating-scale, and on which the divisions may be all of equal length.

The invention consists in applying to the indicating-hand or device a retarder in the form of a coiled spring having an initial tension, which normally holds the indicating device at a predetermined or initial position with such force that the hand will not be moved by a current of low potential, but will only begin to move when a comparatively high electromotive force is present in the circuit of the instrument. When such electromotive force (which will be the minimum potential which will ever be used in the system for which the indicator is adapted) exists, the hand or indicating device will begin to move over the scale.

The invention also consists in providing magnetic plates or bodies adjacent to the operating-coils of the indicator, and so shaping or arranging said magnetic bodies as to change or modify the field of force in such manner that the indicating device shall be moved equal distances by equal increments of potential at whatever point of the scale the hand may be when such increment takes place and at whatever tension the retarder-spring may be; and the invention consists, finally, in the several combinations specifically set forth in the claims.

In the accompanying drawings, which illustrates the improvement, Figure 1 is an end view of the indicator, the top cover being removed. Fig. 2 is a view at right angles to Fig. 1. Fig. 2ª is a view of the spring at the opposite side of the instrument from that shown in Fig. 1. Fig. 3 is a detail view showing the part to which the indicating-hand is attached. Fig. 4 is a detail view of a part used at the opposite end of the spindle on which the hand is mounted, and Fig. 5 is a view of the indicator-scale.

The operating parts of the indicator are mounted on a suitable base 1, and consist, essentially, in the preferred form, of two coils 2 3, mounted side by side at a short distance apart, and a pivoted coil or armature 4 on a central spindle 5, mounted in bearings 6. These parts, as well as the circuit connections, are well known and need not be described in detail.

On the spindle 5 is an arm 7, carried by a sleeve 8, and a metal plate 9, which is or may be weighted at 10 to balance the arm. This plate is provided with an arm or extension 11, to which the outer end of the coiled spring 12 is secured, the opposite end of said spring being secured to the fixed sleeve, through which passes the pivot-screw 13, as shown. The object of this spring is to conduct current to the armature-coil in the usual manner. This spring is under no tension when the pointer is at its lowest point. The hand or indicating device 7 is also provided with a fan 14 to prevent sudden and irregular movements of the same. The end 15 of this pointer extends over the scale 16. At the other end of the spindle 5 is placed a second coiled spring 12'. This end of the spindle is pivoted on the screw 17. An angle-arm 18, secured to the spindle, has an end extending beyond the bearing, and to this is connected the outer end of the spring 12', the opposite end being secured to the fixed sleeve, as shown. This spring 12' is of considerably greater length than spring 12, and is coiled so as to have an initial tension, and is connected to the spindle in such direction that it tends to hold the indicating device at the initial position. The spring cannot move the indicating device or pointer backward farther, since the armature is so mounted that it strikes the inner surface of the coil and is thus arrested. Any other suitable stop for the armature or for the indicating-hand may be employed.

If the indicator is to be used in a system where the current employed is never designed to be below, say, eighty-five volts, but will vary from this point up to one hundred and fifteen volts, or if it is desired to have the indicators capable of use with that range, the scale will have no subdivisions for a lower electromotive force than eighty-five volts, and the tension of the spring 12' will be sufficient to hold the hand in its retracted position unless that voltage is present. When, however, the voltage is eighty-five, the hand will move to a corresponding point on the scale which is near the starting-point. It will be seen that by this means the whole scale can be divided up into thirty divisions, (from 85 to 115,) each division being large, so that reading is easy.

The natural scale of this instrument has very unequal divisions. In order that a scale having equal divisions may be employed, I place magnetic plates or bodies adjacent to the operating-coils, preferably using two soft iron plates 19 20, bent into substantially the form shown, the former being secured to the spool of coil 2 at the bottom by screws 21, and the latter being secured to the spool of coil 3 at the top by screws 22. These plates are so formed and placed that they modify the field of force of the operating-coils, thus causing the pointer to be moved the same distance by a definite rise in potential at whatever point the hand may be when such rise occurs.

It will be evident that the magnetic bodies for modifying the field need not be supported in just the manner indicated, neither need they be of the exact shape shown.

What I claim is—

1. In an electrical indicator, the movable element thereof turning upon pivots and carrying a pointer, in combination with two coiled springs located at the opposite pivots of the movable element, one of such coiled springs having no tension at the initial position of the indicator, while the other of such springs has an initial tension, substantially as and for the purposes set forth.

2. The combination, in an electrical indicator, of a coil or coils adapted to be connected to a circuit, an indicating device moved thereby, one or more magnetic plates or bodies mounted in position to modify the magnetic field of said coil or coils, whereby said indicating device will be moved equal distances by equal increments of current, substantially as described.

3. The combination, in an electrical indicator, of a coil or coils adapted to be connected to a circuit, an indicating device moved thereby, one or more magnetic plates or bodies mounted in position to modify the magnetic field of said coil or coils whereby said indicating device will be moved equal distances by equal increments of current, and a scale divided into practically equal divisions over which said indicating device moves, substantially as described.

4. The combination, in an electrical indicator, of two coils adapted to be connected to a circuit, an indicating hand mounted on a spindle passing centrally between said coils, a coil or armature on said spindle, and a bent magnetic plate on the outer face of each of said two coils for modifying the magnetic field, substantially as described.

5. The combination, in an electrical indicator, of two coils adapted to be connected to a circuit, an indicating hand mounted on a spindle passing centrally between said coils, a coil or armature on said spindle, a bent magnetic plate on the outer face of each of said two coils for modifying the magnetic field, and a scale having practically equal divisions over which said hand moves, substantially as described.

This specification signed and witnessed this 28th day of December, 1891.

JOHN W. HOWELL.

Witnesses:
CHARLES M. CATLIN,
E. A. MACCLEAN.